Oct. 27, 1931.  C. L. KESSLER  1,829,485
ADJUSTABLE REAMER
Filed July 23, 1927   2 Sheets-Sheet 1
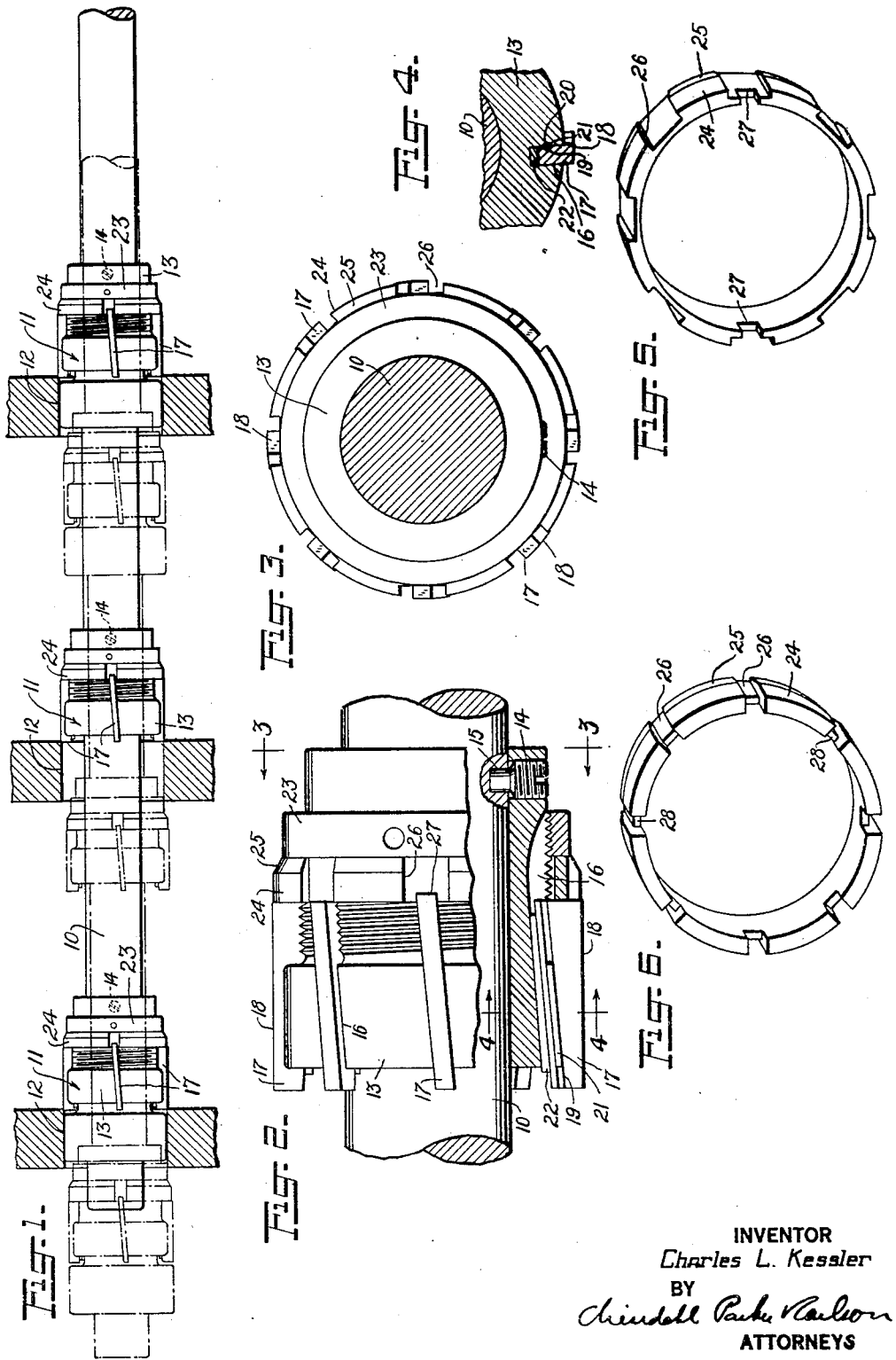
INVENTOR
Charles L. Kessler
BY
ATTORNEYS Oct. 27, 1931.   C. L. KESSLER   1,829,485
ADJUSTABLE REAMER
Filed July 23, 1927    2 Sheets-Sheet 2
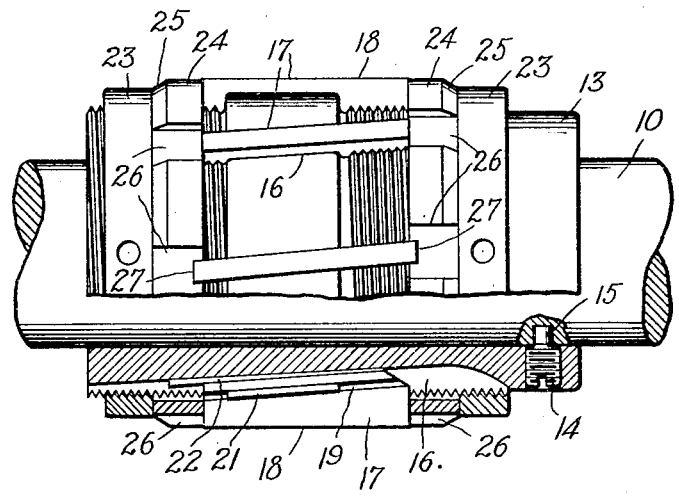
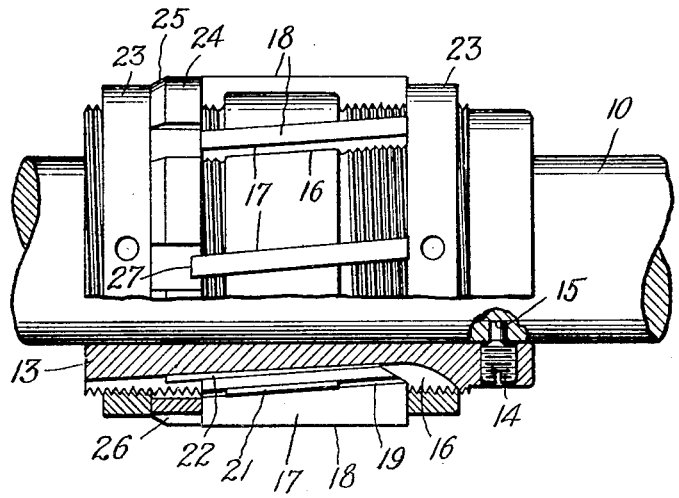
INVENTOR
Charles L. Kessler
BY
ATTORNEYS Patented Oct. 27, 1931

1,829,485

UNITED STATES PATENT OFFICE

CHARLES L. KESSLER, OF ROCKFORD, ILLINOIS, ASSIGNOR TO BARBER-COLMAN COMPANY, OF ROCKFORD, ILLINOIS, A CORPORATION OF ILLINOIS

ADJUSTABLE REAMER

Application filed July 23, 1927. Serial No. 207,832.

The present invention relates to improvements in rotary cutters, such as reamers.

In reaming operations, the reamer is not held positively in accurately centered position with respect to the bore which is to be reamed, but acts to center itself upon entering the bore. Due to flexure, misalignment, or weight of the reamer supporting spindle, the reamer is off-center when not in the bore. This is true particularly of gang reamers which are mounted on a single long spindle or shaft, and which when not in the bores are supported by the work. Thus, when the reamer blades are just outside of the bore, the reduced end, either forward or rear as the case may be, of the reamer will rest on the lower side of the bore so that the reamer will be off-center. In entering the bore, the blades, where they terminate abruptly, as in adjustable blade reamers, will strike the front edge of the bore, thereby resulting in inconvenience, deficient workmanship and chipping. This is particularly objectionable where the reamer after the completion of the reaming operation is to be withdrawn through the finished bore. The primary object of the present invention therefore resides in the provision of a reamer having a novel means for piloting the ends of the blades into the bore without meeting any substantial interference.

A more specific object resides in the provision of a new and improved reamer having a pilot member which is adapted to be positioned against the ends of the blade, which is but slightly less in diameter than the circle of revolution of the blades, and which has a beveled lead or nose adapted to guide or pilot the ends of the blades into the bore without mutilating the edge thereof.

In adjustable blade reamers, it is necessary in many instances to leave the ends of the blades exposed so as to permit tapping thereof for effecting longitudinal adjustment. Another object of the present invention therefore resides in the provision of a reamer having a novel pilot means of the above character which leaves a substantial portion of the end of each blade exposed so that said pilot means need not be removed to permit adjustment of the blades.

A more specific object resides in the provision of a new and improved pilot ring which is adapted to be mounted on the reamer next to the rear ends of the blades, which has a plurality of spaced lateral notches in its outer periphery adapted to be positioned in registration with the ends of said blades, and which has one or more notches adapted respectively to engage one or more blades to hold the blades and said first mentioned notches in registration.

Another object is to provide a novel reamer having pilot means of the above character on both ends.

Further objects and advantages will become apparent as the description proceeds.

In the accompanying drawings:

Figure 1 is a view of a plurality of reamers embodying the features of my invention, and ganged on a shaft for simultaneously reaming a plurality of bores.

Fig. 2 is an enlarged view, partially in longitudinal section, of one of the reamers mounted on said shaft and provided with a pilot member on its rear end.

Fig. 3 is a transverse sectional view taken along the line 3—3 of Fig. 2.

Fig. 4 is a fragmentary sectional view taken along line 4—4 of Fig. 2.

Fig. 5 is a perspective view of the pilot member shown in Fig. 2.

Fig. 6 is a perspective view of a modified form of pilot member.

Fig. 7 is an enlarged view, partially in longitudinal section, of a reamer having a pilot member on each end.

Fig. 8 is a view similar to Fig. 7 of a reamer having a pilot member on its forward end.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring to the exemplary embodiment of the invention, 10 represents a suitable shaft or spindle on which a plurality of reamers 11 are mounted in spaced relation to ream simultaneously a series of aligned bores 12.

Referring particularly to Figs. 2 and 4, I have shown one type of reamer to which my invention may be applied. It is to be understood however that the invention is applicable to different types of reamers. Each reamer 11 comprises a body 13 which is adapted to be secured to the shaft 10 by any suitable means, such as the pin 14 threaded through the body into a depression 15 in the shaft. Formed in the outer peripheral surface of the body 13, and extending in a generally longitudinal direction are a plurality of grooves 16 in which a series of cutting tools or blades 17 are adjustably mounted. In the present instance, the grooves 16 are equally spaced and slightly inclined with respect to the longitudinal axis of the cutter. The inner surface of each groove 16 is inclined inwardly and rearwardly to constitute a wedge surface.

The blades 17 are formed with cutting edges 18 curved to lie in a cylindrical surface corresponding to that of the bore to be reamed. Each blade 17 has a close sliding fit with one of the grooves 16. The inner surface of each blade 17 is inclined and at an angle to the inner surface of the groove 16. Formed in the front face of each blade 17 is a semi-cylindrical groove 19. A complementary groove 20 is formed in the adjacent side of each groove 16. These grooves 19 and 20 extend longitudinally of the blades 17 and parallel to the inner edges thereof. A pin 21 is positioned in each set of grooves 19 and 20. A wedge member 22 is positioned between the inner surfaces of each notch 16 and blade 17, and serves to force the latter outwardly into shearing or locking engagement with the pin 21. Any other suitable means of locking the blades in position may be provided.

The rear end of the body 13 is screw threaded, and has a ring or lock nut 23 adjustable thereon. Loosely mounted on the body 13 between the rear ends of the blades 17 and the ring 23 is a pilot member 24. This pilot member has an outside diameter but slightly less than the circle of revolution of the blades. The outer or lead end of the pilot member 24 is beveled at 25 to a diameter approximately equal to that of the ring 23. Referring to Fig. 1, the position of the gang reamers at the start of the reaming operation is shown in full outline, and at the completion of the reaming operation is shown in dotted outline. It will be noted that when the reamers 11 are in the dotted position, the rings 23 rest on the lower sides of the bores 12, and the reamers are off-center. In withdrawing the reamers 11 from the dotted position through the finished bores 12, the noses 25 of the pilot members approximately center the reamers before the blades 17 enter the bores and the pilot members 24 hold the ends of the blades out of substantial abutting engagement with the rear edges of the bores, thereby preventing injury to the finished surfaces.

In adjustable blade reamers, it is necessary in most instances to tap the rear ends of the blades 17 to adjust the latter. To permit this adjustment without removing the pilot member 24, the latter is formed with a plurality of transverse notches 26 in registration with the ends of the blades and giving access to the latter. Means is provided for holding the notches 26 in registration with the ends of the blades. This means comprises one or more notches 27 in the front or inner edge of the pilot member adapted to engage or fit over the front ends of one or more blades 17 extending somewhat ahead of the other blades. Each notch 27 is formed at the inner end of one of the notches 26.

In the construction shown in Fig. 6, a notch 28, corresponding to the notch 27 in Fig. 5, is provided for each blade 17. The notches 28 are coextensive in width with the notches 26.

In Fig. 7, I have shown a reamer provided with pilot members 24 and lock nuts 23 at both ends. In this construction, both ends of the body 13 are screw threaded. In Fig. 8, I have shown a reamer provided with a pilot member 24 only at the front end, and lock nuts 23 at both ends. It will be understood that the pilot member 24 on the front end of the reamer serves to center the blades 17 to prevent a substantial abutting engagement with the front edge of the bore when entering the latter to ream the same.

I claim as my invention:

1. A reamer having, in combination, a body having a plurality of generally longitudinal grooves, a plurality of blades, one blade mounted in each of said grooves, means for clamping said blades in said grooves, said blades being longitudinally and radially adjustable in said grooves, a pilot member removably mounted on the rear end of said body in abutting relation with the rear ends of said blades, said pilot member having a diameter slightly less than the cylinder of revolution of the blades, having a beveled nose on its rear end, having a plurality of lateral notches in registration with the ends of said blades, and having a key connection with one of said blades to hold said notches in registration with said blades, and a lock ring threaded onto the rear end of said body against the nose of said pilot member.

2. A reamer having, in combination, a body having a plurality of generally longitudinal grooves, a plurality of blades, one blade mounted in each of said grooves, means for holding said blades in said grooves, said blades being longitudinally and radially adjustable in said grooves, a pilot member removably mounted on the rear end of said body in abutting relation with the rear ends of said blades, said pilot member having a plurality of lateral notches in registration with the ends of said blades, means for holding said notches in registration with said blades, and a member threaded onto the rear end of said body against said pilot member.

3. A reamer having, in combination, a body having a plurality of generally longitudinal grooves, a plurality of blades, one blade mounted in each of said grooves, means for clamping said blades in said grooves, said blades being longitudinally adjustable in said grooves, a pilot member removably mounted on the rear end of said body in abutting relation with the rear ends of said blades, said pilot member having a diameter slightly less than the cylinder of revolution of the blades, having a beveled nose on its rear end, having a plurality of lateral notches in registration with the ends of said blades and having a plurality of end notches embracing the ends of said blades to hold said lateral notches in registration with said blades, and means for holding said pilot member in position.

4. A reamer having, in combination, a body having a plurality of generally longitudinal grooves, a plurality of blades, one blade mounted in each of said grooves, means for clamping said blades in said grooves, said blades being longitudinally adjustable, a pilot member mounted on one end of said body in abutting relation with the adjacent ends of said blades, said pilot member having a plurality of lateral notches in registration with the ends of said blades to expose the latter and means for holding said pilot member in position.

5. A reamer having, in combination, a body having a plurality of generally longitudinal grooves, a plurality of blades, one blade mounted in each of said grooves, means for clamping said blades in said grooves, said blades being longitudinally adjustable in said grooves, a pilot member adjustably mounted on one end of said body in abutting relation with the adjacent ends of said blades, said pilot member having a plurality of lateral notches in registration with the ends of said blades to expose the latter and having a plurality of end notches embracing a corresponding number of blades to hold said lateral notches in registration with said blades, and means for holding said pilot member in position.

6. A reamer having, in combination, a body having a plurality of longitudinal blades, a pilot ring adjustably mounted on one end of said body in abutting relation with the adjacent ends of said blades, said ring having a plurality of lateral notches in alignment with the ends of said blades, means for holding said ring against rotation on said body when in engagement with said blades, and means for holding said ring in engagement with said blades.

7. A reamer having, in combination, a body having a plurality of generally longitudinal grooves, a plurality of blades, one blade mounted in each of said grooves, said blades being longitudinally adjustable in said grooves, a pilot ring mounted on one end of said body in abutting relation with the adjacent ends of said blades, said pilot member having a plurality of lateral notches in registration with the ends of said blades, a ring on said body for holding said pilot ring against said blades, said ring being of smaller diameter than said pilot ring, and the nose of said pilot ring being tapered down to the diameter of said last mentioned ring.

8. A reamer comprising, in combination, a body having a plurality of generally longitudinal grooves, a plurality of blades, one mounted in each of said grooves, said blades being longitudinally adjustable in said grooves, means in said grooves coacting with said blades to effect radial adjustment of said blades upon longitudinal adjustment thereof, a pilot ring removably mounted on one end of said body in abutting engagement with the adjacent ends of said blades, said pilot ring having a plurality of lateral notches in registration with the ends of said blades and having a plurality of end notches adapted to receive the ends of said blades, and a ring on said body in abutting engagement with said pilot ring and substantially smaller in diameter than said pilot ring, said pilot ring having a nose on its outer end tapering gradually to the diameter of said last mentioned ring.

In testimony whereof, I have hereunto affixed my signature.

CHARLES L. KESSLER.